July 18, 1961 C. W. GEER ET AL 2,993,125
POSITIVE HELIOTROPIC DEVICE
Filed Dec. 24, 1959
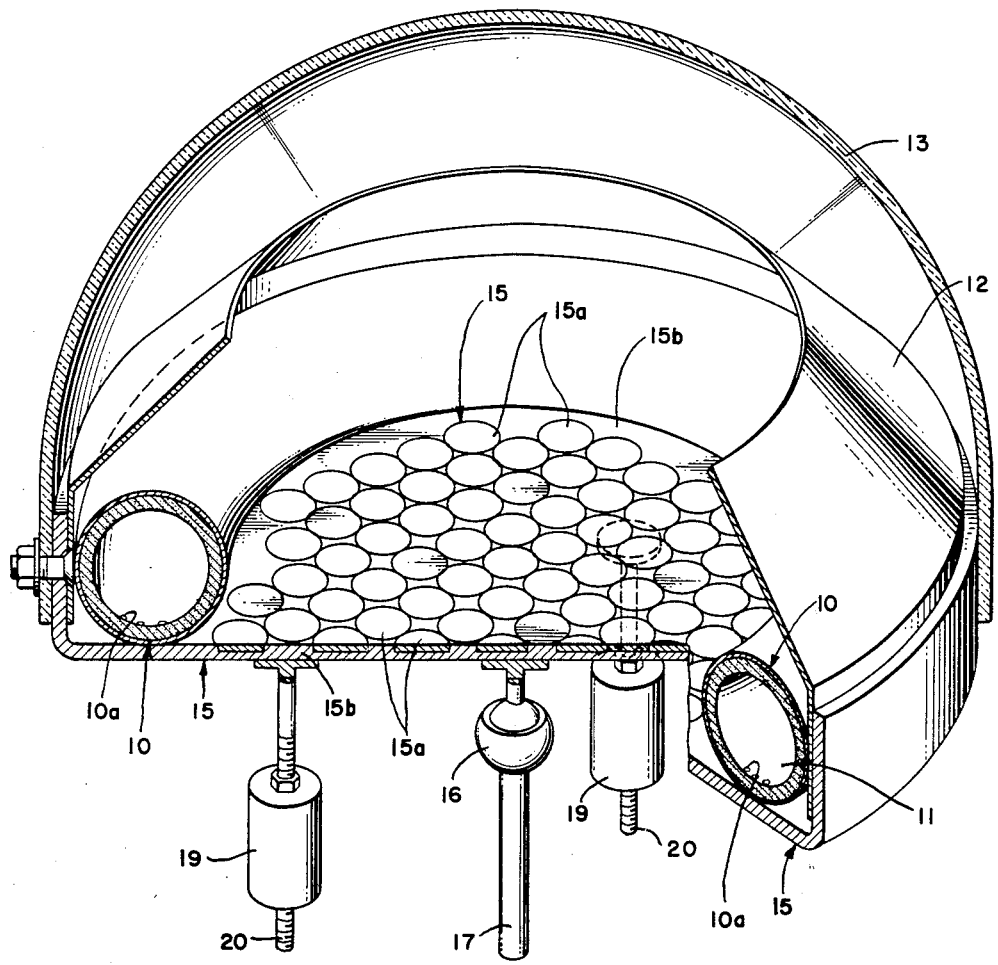
CHARLES W. GEER
WILLIAM W. JACQUISH
*INVENTORS.*
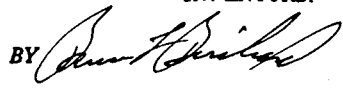
ATTORNEY.

2,993,125
POSITIVE HELIOTROPIC DEVICE

Charles Willard Geer and William W. Jacquish, Los Angeles, Calif., assignors to Hoffman Electronics Corporation, a corporation of California
Filed Dec. 24, 1959, Ser. No. 861,994
19 Claims. (Cl. 250—215)

The present invention relates to self-orienting positive heliotropic devices and, more particularly, to such devices which are used to orient converters which transform solar energy into electrical, chemical, mechanical, or thermal energy.

Energy converters have been devised and produced which transform solar energy into various other types of energy. In recent years, silicon photovoltaic converters, sometimes called "solar cells" have become attractive as means for converting solar energy into electrical energy. In order to derive maximum power from a converter panel, it is necessary that the cells making up the panel be positioned in such a manner that they face the sun directly. Since the earth's rotation results in a relative east-west movement of the sun over the surface of the earth, it is necessary that the solar cells be constantly oriented. The need is apparent for a lightweight, inexpensive device which will track the sun and constantly keep a solar energy converter oriented so that the sun's rays strike the converter with normal incidence.

Therefore, one of the objects of the present invention is to provide an inexpensive, reliable device which will track the sun and thus keep the associated solar energy converter oriented in such a manner that the sun's rays strike the converter with normal incidence.

Another object of this invention is to provide a device of the type described which operates under its own power and is not dependent on some outside source of power such as a battery, generator, or a portion of the energy converted by the solar energy converter.

According to the present invention a solar cell panel or other form of solar energy converter is attached to a toroidal tube with the active surface of the converter lying generally in a plane parallel to the average plane of the tube. The tube, which is so mounted as to have two degrees of freedom, contains a quantity of liquid with a low boiling point. The toroidal tube is shielded in such a manner that equal amounts of sunlight strike corresponding regions of the tube when the sun ray incidence upon the tube is normal. The present invention utilizes vaporization and condensation to transfer the mass of the liquid in order to change the static balance of the mechanism thus orienting in such a manner as to follow the sun.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which the sole figure is an oblique view, partially sectioned, of the preferred embodiment of the present invention.

As seen in the sole figure, tube 10 is made of transparent polyvinyl chloride and is toroidal in shape. Layer 11 is a semi-porous or absorbent material, such as sponge, black or otherwise dark in color, which coats the interior surface of tube 10. Liquid 10a, having a low boiling point, is contained within tube 10 and absorbed by layer 11. Liquid 10a may be ether. Shield 12, which has a highly reflective outer and upper surface, encircles the outer periphery of tube 10 and extends upward and over the tube, shielding the major portion of the tube from direct impingement of solar energy falling normal to the average plane of toroidal tube 10. Shield 12 can be made of aluminum foil. The entire mechanism is covered by transparent dome 13, which is made of polymethylmethacrylate. Tube 10 rests upon solar energy converter panel 15 and can be cemented thereto. Tube 10 can also be cemented to shield 12. Solar energy converter panel 15, dome 13, and shield 12 are bolted together. Solar energy converter panel 15 lies parallel to the average plane of tube 10 and comprises solar cells 15a and platform 15b, which is made of a thick sheet of aluminum to conduct heat away from solar cells 15a. Attached to the lower surface of platform 15b at its geometric center is brass ball and socket joint 16, which is attached to aluminum shaft 17. Joint 16 should be located slightly above the center of gravity of the device, and, therefore, lead weights 19 are connected to platform 15b to lower the center of gravity. Weights 19 can be raised or lowered on threaded shafts 20, thereby varying the center of gravity. For marine and similar uses, dome 13, shaft 17, and the associated support means can be omitted, and the tube, shield and remaining apparatus encapsulated in a floatable transparent sphere.

When solar energy is incident upon tube 10 at an angle to the average plane, shield 12 causes a greater amount of sunlight to strike that portion of tube 10 which is farthest from the sun and a lesser amount of sunlight to strike that portion of the tube which is nearest the sun, resulting in an unequal heating along the length of tube 10. The liquid in that portion of tube 10 receiving the greatest insolation is heated, evaporates and the resulting vapor moves to other portions of tube 10 which are relatively cooler. Vapor reaching the cooler portion of tube 10 condenses and is absorbed by layer 11, which prevents the liquid from running from one portion of the tube to another. That portion of tube 10 which is nearest the sun is shielded to the greatest extent and, therefore, is relatively the coolest portion of tube 10. As a result, the greatest amount of condensation takes place in that portion of tube 10 that is nearest the sun, causing unbalance of tube 10 and tipping of tube 10 and the associated converter panel 15 on joint 16 toward the sun until tube 10 is insolated equally along its length and the solar energy falls upon converter 15 with normal incidence. Thus, daily and seasonal tracking of the sun are effected.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A positive heliotropic device comprising a toroidal tube containing a predetermined quantity of liquid having a low boiling point and capable of wetting said tube; a shield supported adjacent said tube along its periphery and movable in concert therewith, said shield extending over the major portion of the upper surface of said tube; so that when solar energy is incident upon said tube at an angle that is not normal to the average plane of said tube, a greater amount of solar energy strikes that portion of the tube which is farther from the sun than strikes that portion of the tube which is nearer the sun, and unequal heating of said tube and redistribution of said liquid occur; a support means rotatably coupled to said tube whereby said tube can rotate until said tube is equally insolated and said device statically balanced; and an orientatable means coupled to said tube.

2. A device according to claim 1 wherein there is a coating of semiporous material on the interior surface of the toroidal tube to retain the liquid in that portion of the tube in which it condenses.

3. A device according to claim 1 wherein said orientatable means comprises a solar energy converter panel that is positioned in a plane parallel to the average plane of the tube.

4. A device according to claim 1 wherein said tube and shield are covered by a transparent dome.

5. A device according to claim 1 wherein said support means is a pole, and said tube is connected to said support means through a rotating joint.

6. A device according to claim 1 wherein said toroidal tube is made of a transparent material.

7. A device according to claim 2 wherein the coating of semi-porous material is dark in color.

8. A device according to claim 7 wherein said toroidal tube is made of a transparent material.

9. A positive heliotropic device comprising a closed chamber containing a predetermined quantity of liquid having a low boiling point and capable of wetting said tube; a shield coupled to said closed chamber and movable in concert therewith, said shield being so shaped and positioned that when said closed chamber and a source of radiant energy are in a first predetermined relation, an insolation of said chamber occurs that establishes a temperature differential therein, resulting in a re-distribution of said liquid and a change in the static balance of said device; a support means movably coupled to said closed chamber in such a manner that when said transfer of liquid occurs, said closed chamber can move until said chamber and said radiant energy source are in a second predetermined relation and said device is statically balanced; and an orientatable means coupled to said closed chamber.

10. A device according to claim 9 wherein said shield enables said temperature differential to be established by allowing a greater amount of radiant energy to strike a first portion of said chamber than strikes a second portion of said chamber.

11. A device according to claim 9 wherein said orientatable means comprises a solar energy converter panel.

12. A device according to claim 9 wherein there is a coating of absorbent material on the interior surface of said chamber.

13. A device according to claim 12 wherein said chamber is made of a transparent material and said absorbent material is dark in color.

14. A device according to claim 9 wherein said chamber has a circular configuration.

15. A device according to claim 9 wherein said chamber is ring-like in shape.

16. A device according to claim 9 wherein said chamber is a tore.

17. A device according to claim 9 wherein said chamber is a toroidal tube.

18. A positive heliotropic device comprising a toroidal tube containing a predetermined quantity of liquid having a low boiling point, said tube having a coating of semi-porous material on its interior surface to retain said liquid in that portion of said tube in which it condenses; a shield supported adjacent said tube along its periphery and movable in concert therewith, said shield extending over the major portion of the upper surface of said tube so that when solar energy is incident upon said tube at an angle that is not normal to the average plane of said tube, a greater amount of solar energy strikes that portion of said tube which is farther from the sun than strikes that portion of said tube which is nearer the sun, and unequal heating of said tube and re-distribution of said liquid occur; a support means rotatably coupled to said tube whereby said tube can rotate until said tube is equally insolated and said device statically balanced; and an orientatable means coupled to said tube.

19. A positive heliotropic device comprising a closed chamber containing a predetermined quantity of liquid having a low boiling point, said closed chamber having a coating of absorbent material on its interior surface; a shield coupled to said closed chamber and movable in concert therewith, said shield being so shaped and positioned that when said closed chamber and a source of radiant energy are in a first predetermined relation, an insolation of said chamber occurs that establishes a temperature differential therein, resulting in a re-distribution of said liquid and a change in the static balance of said device; a support means movably coupled to said closed chamber in such a manner that when said transfer of liquid occurs, said closed chamber can move until said chamber and said radiant energy source are in a second predetermined relation and said device is statically balanced; and an orientatable means coupled to said closed chamber.

References Cited in the file of this patent

UNITED STATES PATENTS

| | | |
|---|---|---|
| 1,976,428 | Arthuys et al. | Oct. 9, 1934 |
| 2,597,890 | Monk | May 27, 1952 |
| 2,640,313 | Cobb | June 2, 1953 |
| 2,902,028 | Manly | Sept. 1, 1959 |